Patented Aug. 15, 1933

1,922,492

UNITED STATES PATENT OFFICE 1,922,492

PROCESS OF PRODUCING HYDROCYANIC ACID

Edward Münch, Fritz Nicolai, Reinhold Fick, and Walter Reppe, Ludwigshafen-on-the-Rhine, Germany, assignors to I. G. Farbenindustrie Aktiengesellschaft, Frankfort-on-the-Main, Germany, a Corporation of Germany No Drawing. Application February 29, 1924, Serial No. 696,071, and in Germany March 1, 1923

8 Claims. (Cl. 23—151)

We have found that hydrocyanic acid can be produced with excellent yields by passing formamid, or ammonium formate, which may be regarded as formamid in a hydrated state, over a catalyst at an elevated temperature and in intimate mixture with a gas. Generally the reaction begins at about 200 degrees centigrade and becomes more rapid and more complete at higher temperatures. The most suitable temperature varies, according to the actual conditions of working, but generally lies between about 300 degrees and 500 degrees or even 600 degrees centigrade. The reaction consists in a nearly complete cleavage into water and hydrocyanic acid; an undesired decomposition with a formation of carbon monoxid and ammonia, if any, takes place in a very small degree. As gases serving as diluents for the formamid or ammonium formate may be used for example, nitrogen, hydrogen, carbon monoxid, blue water gas, producer gas, also ammonia either alone or mixtures of several of such gases. By the expression "gases" we wish to comprise such gases as do not interfere with the desired reaction, and of course, gases leading to undesirable reactions, such for example as chlorine, ozone, phosgene, NCl₃, HCl, NO₂, and the like, are not proper diluents and must be excluded. If ammonia or a gas containing ammonia is employed, the hydrocyanic acid formed combines with the ammonia present to form ammonium cyanid which is carried away with the reaction gases, while in the absense of ammonia free hydrocyanic acid is obtained. When using free ammonia, free formic acid may also be employed in which case ammonium formate is formed prior to the reaction. These diluent gases will be hereinafter referred to as "gases inert to formamide" by which is meant gases which do not react with formamide. The action of these diluent gases is purely physical and is not confined to any particular inert gas but is characteristic of any gas which is inert to formamide.

The compounds to be treated may be distributed in the diluting gas in any proper manner, for example by atomizing them, while in a liquid condition, through a nozzle by means of the gas current before its admittance to the catalyst; or they may be vaporized and the vapors mixed with the gases and then led to the contact mass. Vaporizing may be effected by means of a hot gas current which may have a temperature sufficient to allow the mixture to enter the reaction vessel with about 300 degrees centigrade, so that a superheating of the contact mass, which otherwise would be required, can be dispensed with. Notwithstanding the high temperature of the gas current which surpasses the boiling point of formamid, an undesired decomposition of the formamid does not take place under these circumstances. As catalysts those of a dehydrating character promoting the splitting off of water are considered suitable; they may be used either alone or in mixtures and with or without suitable supports.

It is of particular advantage to employ mixtures of formamid and ammonium formate, as such mixtures are liquid at ordinary or slightly raised temperature and can, therefore, be handled very comfortably.

In the case of gases containing ammonia, the reaction temperature is generally kept below about 400 degrees centigrade while in the absence of ammonia higher temperatures are very suitable, provided the gases are rapidly carried away from the reaction zone. To this end, the contact layer is kept short and the velocity of the gas current high.

The following examples serve to further illustrate the invention and the manner of carrying the same into effect, but the invention is not limited to these examples.

Example 1

Formamid is atomized through a nozzle by means of a current of ammonia gas and the intimate mixture is then passed, at between 300 degrees to 350 degrees centigrade over a catalyst, prepared by applying a paste of manganese carbonate to granulated bauxite, drying and reducing with hydrogen or methanol vapors, which catalyst is placed in an electrically heated iron or porcelain tube. The vapors which have undergone the reaction are absorbed with aqueous ammonia. Ammonium cyanid is formed with a yield of 85 per cent of the theoretical quantity.

Example 2

Formamid is vaporized at between 130 degrees to 140 degrees centigrade while passing through it a strong current of gaseous ammonia and the mixture is passed over bauxite poor in iron and being in the form of small sized grains, while maintaining a temperature of about 300 degrees or 310 degrees centigrade. The reaction gases containing ammonium cyanid and free ammonia are passed through strong caustic soda solution. Cyanid is formed with a yield of 99 per cent of the theoretical quantity.

The formamid which, by the way, need not be dry but may contain dissolved water, can also be vaporized by a current of nitrogen or other gas, at the temperature aforementioned, and ammonia added to the gas charged with the vapors prior to the catalytic treatment, or to the nitrogen or other gas prior to, or during the vaporization of the formamid.

Example 3

A mixture composed of about 80 per cent, by weight, of ammonia formate, 10 per cent of formamid and 10 per cent of formic acid is atomized through a nozzle by means of a strong current of ammonia, whereupon the mixture is passed over granulated bauxite at between 275 degrees and 325 degrees centigrade. The reaction gas consisting of ammonium cyanid, ammonia gas and water vapor is introduced into concentrated caustic soda solution. Sodium cyanid is produced with a yield surpassing 80 per cent of the theoretical quantity.

In this example, instead of the mixture of ammonium formate, formamid and formic acid, a saturated aqueous solution of ammonium formate, or a mixture of ammonium formate and formic acid, or formic acid alone, or ammonium formate alone, either in a molten or finely ground condition, may also be employed.

Example 4

A mixture composed of about 50 per cent, by weight, of ammonium formate, 40 per cent of formamid and 10 per cent of formic acid is evaporated by passing a current of ammonia gas through it at about 140 degrees to 150 degrees centigrade, whereupon the vapors are passed over finely granulated bauxite, poor in iron. The vapors which have undergone the reaction are absorbed with strong caustic soda solution. Sodium cyanid is obtained with 97 per cent of the theoretical quantity.

Mixtures of ammonium formate and formamid, ordinarily containing greater or less quantities of free formic acid, can be produced very simply by heating for a while ammonium formate or the residue obtained by evaporating ammonium formate solutions to a temperature at which carbon monoxid is not formed, for example between 120 degrees to 150 degrees centigrade, either at ordinary, diminished or increased pressure. Such mixtures have the welcome property of being liquid at ordinary or slightly raised temperature and accordingly being easily atomized.

Example 5

Formamid is vaporized in a strong hot current of nitrogen of about 300 degrees centigrade and the vapors are passed, at temperatures from 500 degrees to 550 degrees centigrade, over finely divided bauxite, poor in iron, the length of the contact layer being about 6 inches. The vapors which have undergone the reaction consisting of hydrocyanic acid, water vapor and nitrogen, are led through concentrated caustic potash solution, potassium cyanid being obtained thereby. The remaining gas from which water has been removed, if necessary, can be led through a preheater or heat-exchanger back to the vaporizer by means of a circulating pump.

Hydrocyanic acid may also be obtained directly from the vapors by cooling or adsorption with active charcoal.

What we claim is:

1. The process of manufacturing hydrocyanic acid which consists in passing formamid together with a gas inert to formamide over a catalytic mass at a temperature of between about 200 degrees and 600 degrees centigrade.

2. The process of manufacturing hydrocyanic acid which consists in passing formamid together with a gas inert to formamide over a catalytic mass at a temperature of between about 300 degrees and 500 degrees centigrade.

3. The process of manufacturing hydrocyanic acid which consists in passing formamid together with a gas inert to formamide containing free ammonia over a catalytic mass of a dehydrating character at a temperature of between about 200 degrees and 600 degrees centigrade.

4. The process of manufacturing hydrocyanic acid which consists in passing formamid together with a gas inert to formamide over a catalytic mass containing aluminium oxid at a temperature of between about 200 degrees and 600 degrees centigrade.

5. The process of manufacturing hydrocyanic acid which consists in vaporizing formamid with a current of gas inert to formamide having a temperature surpassing the boiling point of formamid and leading the mixture over a contact mass of a dehydrating character.

6. The process of manufacturing hydrocyanic acid which consists in distributing a mixture of formamid and ammonium formate in a current of gas inert to formamide, then leading the gas current loaded with the vapors of the said mixture through a catalytic mass of a dehydrating character at a temperature of between about 200 and 600° C.

7. The process of manufacturing hydrocyanic acid which consists in distributing a mixture of formamid, ammonium formate and free formic acid in a gas inert to formamide containing free ammonia and leading the gaseous mixture over a catalytic mass containing aluminium oxid at a temperature of between about 300 degrees and 500 degrees centigrade.

8. A process for the manufacture of hydrocyanic acid by the thermal decomposition of formamide in the presence of a catalyst which comprises supplying the total heat required for said decomposition by mixing a hot inert gas with the formamide vapor and passing the mixture over said catalyst.

EDUARD MÜNCH.
FRITZ NICOLAI.
REINHOLD FICK.
WALTER REPPE.